United States Patent
Ha et al.

(10) Patent No.: US 9,666,849 B2
(45) Date of Patent: May 30, 2017

(54) SEPARATOR HAVING IMPROVED POROUS COATING LAYER HAVING HIGH PACKING DENSITY AND ELECTROCHEMICAL DEVICE COMPRISING THE SAME

(71) Applicants: LG Chem, Ltd., Seoul (KR); Toray Battery Separator Film Co., Ltd., Tochigi (JP)

(72) Inventors: Jeong-Min Ha, Daejoen (KR); Kee-Young Kim, Daejeon (KR); Byeong-Gyu Cho, Daejeon (KR); Sun-Mi Jin, Daejeon (KR); No-Ma Kim, Daejeon (KR); Jong-Hun Kim, Daejeon (KR); Byoung-Jin Shin, Daejeon (KR)

(73) Assignees: LG Chem, Ltd. (KR); Toray Battery Separator Film Co., Ltd. (JP)

( * ) Notice: Subject to any disclaimer, the term of this patent is extended or adjusted under 35 U.S.C. 154(b) by 0 days.

(21) Appl. No.: 13/621,399

(22) Filed: Sep. 17, 2012

(65) Prior Publication Data

US 2013/0017429 A1 Jan. 17, 2013

Related U.S. Application Data

(63) Continuation of application No. PCT/KR2011/001393, filed on Feb. 28, 2011.

(30) Foreign Application Priority Data

Mar. 17, 2010 (KR) .................... 10-2010-0023891

(51) Int. Cl.
*H01M 2/16* (2006.01)
*H01M 10/0525* (2010.01)

(52) U.S. Cl.
CPC ......... *H01M 2/166* (2013.01); *H01M 2/1653* (2013.01); *H01M 2/1686* (2013.01); *H01M 10/0525* (2013.01)

(58) Field of Classification Search
None
See application file for complete search history.

(56) References Cited

U.S. PATENT DOCUMENTS 5,965,300 A    10/1999  Lee et al.
6,096,456 A *  8/2000   Takeuchi et al. ............. 429/249
(Continued)

FOREIGN PATENT DOCUMENTS

EP    1244158 A1    9/2002
EP    1455407 A2    9/2004
(Continued)

OTHER PUBLICATIONS

Matweb datasheet for Aluminum Hydroxide, 2015.*
(Continued)

*Primary Examiner* — Ula C Ruddock
*Assistant Examiner* — Tony Chuo
(74) *Attorney, Agent, or Firm* — Lerner, David, Littenberg, Krumholz & Mentlik, LLP

(57) ABSTRACT

A separator may include (A) a porous substrate having pores, and (B) a porous coating layer formed on at least one surface of the porous substrate and made from a mixture of inorganic particles and a binder polymer, and the binder polymer may contain a copolymer of (a) a first monomer unit with at least one of an amine group and an amide group at a side chain, and (b) a second monomer unit of (meth) acrylate with an alkyl group having 1 to 14 carbon atoms. The porous coating layer of the separator may have a high packing density, thereby easily forming a thin film battery without hindering safety, and may have good adhesive (Continued)

strength with the porous substrate, thereby preventing detachment of the inorganic particles in the porous coating layer during assembly of an electrochemical device.

15 Claims, 1 Drawing Sheet

(56) References Cited

U.S. PATENT DOCUMENTS

| | | | |
|---|---|---|---|
| 6,632,561 | B1 | 10/2003 | Bauer et al. |
| 2004/0101757 | A1 | 5/2004 | Kii et al. |
| 2004/0175625 | A1 | 9/2004 | Hedhli et al. |
| 2005/0221165 | A1* | 10/2005 | Hennige et al. ............... 429/62 |
| 2007/0259240 | A1 | 11/2007 | Hedhli et al. |
| 2009/0246613 | A1 | 10/2009 | Park et al. |
| 2010/0221965 | A1 | 9/2010 | Katayama et al. |
| 2011/0045338 | A1* | 2/2011 | Bae et al. ..................... 429/144 |
| 2011/0129731 | A1 | 6/2011 | Wakizaka et al. |
| 2011/0143183 | A1* | 6/2011 | Matsumoto et al. ......... 429/144 |
| 2011/0143185 | A1* | 6/2011 | Nishikawa ............ H01M 2/162 429/145 |
| 2011/0159362 | A1 | 6/2011 | Wakizaki et al. |
| 2011/0308727 | A1 | 12/2011 | Kii et al. |
| 2011/0318630 | A1 | 12/2011 | Wakizaka et al. |
| 2012/0189898 | A1 | 7/2012 | Wakizaka et al. |

FOREIGN PATENT DOCUMENTS

| | | | |
|---|---|---|---|
| EP | 2372811 | A1 | 10/2011 |
| EP | 2485302 | A1 | 8/2012 |
| JP | H04198291 | A | 7/1992 |
| JP | 2002-529891 | A | 9/2002 |
| JP | 2006-012561 | A | 1/2006 |
| JP | 2006107832 | A | 4/2006 |
| JP | 2007169550 | A | 7/2007 |
| JP | 2008-287888 | A | 11/2008 |
| JP | 2009135104 | A | 6/2009 |
| JP | 2009527090 | A | 7/2009 |
| JP | 2010-015917 | A | 1/2010 |
| KR | 20060063751 | A | 6/2006 |
| KR | 20070000231 | A | 1/2007 |
| KR | 20090051546 | A | 5/2009 |
| KR | 1020090056811 | A | 6/2009 |
| TW | 519777 | B | 2/2003 |
| WO | 0175991 | A1 | 10/2001 |
| WO | 2007094641 | A1 | 8/2007 |
| WO | 2009/096451 | A1 | 8/2009 |
| WO | 2010/016476 | A1 | 2/2010 |
| WO | WO 2010/021248 A1 * | 2/2010 | ............. H01M 2/16 |
| WO | 2010024328 | A1 | 3/2010 |
| WO | WO 2010/104127 A1 * | 9/2010 | ............. H01M 2/16 |

OTHER PUBLICATIONS

International Search Report for Applicaiton No. PCT/KR2011/001393 dated Oct. 7, 2011.

Ooki Michinori, et al., Unabridged Chemistry Dictionary, Kagaku-Dojin Publishing Company, Inc., Oct. 20, 1989, 1st edition, 1st impression, pp. 874-875 (document shoring properties of titanium oxide: known art).

Paul A. Webb, "Volume and Density Determinations for Particle Technologists." Feb. 2001, pp. 1-15, XP002495931. Retrieved from the Internet: URL: http/www.micrometrics.com/pdf/app_articles/density_determinations/pdf [retrieved on Sep. 15, 2008].

Office Action from European Application No. 11 756 507.7, dated Apr. 13, 2015.

Chemical Dictionary, issued by Public Publishing Corporation, Nov. 19, 1997, abridged edition, 36th impression, p. 972.

* cited by examiner

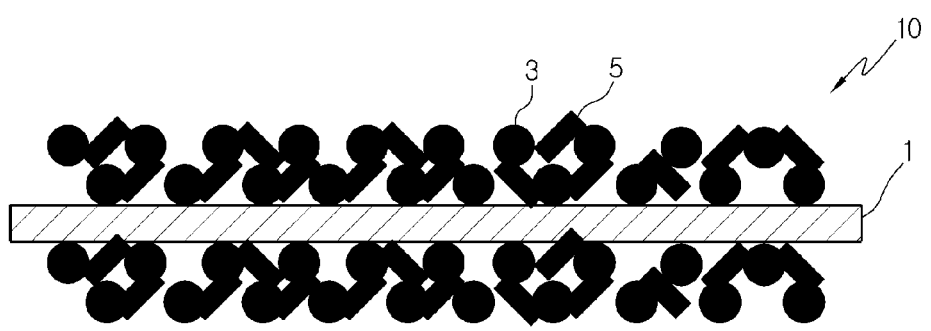

SEPARATOR HAVING IMPROVED POROUS COATING LAYER HAVING HIGH PACKING DENSITY AND ELECTROCHEMICAL DEVICE COMPRISING THE SAME

CROSS-REFERENCE TO RELATED APPLICATION

This application is a continuation of International Application No. PCT/KR2011/001393 filed on Feb. 28, 2011, which claims priority to Korean Patent Application No. 10-2010-0023891 filed in Republic of Korea on Mar. 17, 2010, the entire contents of which are incorporated herein by reference.

TECHNICAL FIELD

The present invention relates to a separator of an electrochemical device such as a lithium secondary battery and an electrochemical device comprising the same, and more particularly, to a separator having a porous coating layer which is made from a mixture of inorganic particles and a binder polymer and is formed on the surface of a porous substrate, and an electrochemical device comprising the same.

BACKGROUND ART

Recently, there has been an increasing interest in an energy storage technology. As electrochemical devices are extensively applied to mobile phones, camcorders, and notebook computers, and further to electric vehicles, a research and development is conducted on the electrochemical devices more deeply. The electrochemical devices are one of the subjects of great interest in this aspect, and in particular, development of rechargeable lithium secondary batteries becomes the focus of attention.

Among currently used secondary batteries, lithium secondary batteries developed in early 1990's have a higher drive voltage and a much higher energy density than those of conventional batteries using a liquid electrolyte such as Ni-MH batteries, Ni—Cd batteries, $H_2SO_4$—Pb batteries, and the like, and thus, they arouse interest.

A variety of electrochemical devices such as lithium secondary batteries have been produced from many companies, and each exhibits different safety characteristics. Thus, the most important consideration of electrochemical devices is safety. In case of malfunction, the electrochemical devices should not cause any damage to users. Taking this into account, safety regulations strictly prohibit safety-related accidents of electrochemical devices such as firing, smoke emission, and the like. According to the safety characteristics of electrochemical devices, explosion may occur when an electrochemical device is overheated and subject to thermal runaway, or when a separator is punctured. In particular, a short circuit may occur between a cathode and an anode, when a polyolefin-based porous substrate that is commonly used as a separator of electrochemical devices shows a significant thermal shrinking behavior at a temperature of 100° C. or above due to its material characteristics and process characteristics such as elongation.

In order to solve the above safety-related problems of electrochemical devices, Korean Patent Publication No. 10-2007-0000231 suggests a separator 10 having a porous coating layer formed by coating at least one surface of a porous substrate 1 having a plurality of pores with a mixture of inorganic particles 3 and a binder polymer 5 (the FIGURE). In this separator, the inorganic particles 3 in the porous coating layer formed on the porous substrate 1 serve as a kind of spacer that keeps a physical shape of the porous coating layer, so the inorganic particles 3 restrain thermal shrinkage of the porous substrate when an electrochemical device is overheated. The binder polymer 5 binds the inorganic particles 3 to each other and secures the inorganic particles 3 contacting with the porous substrate 1 to the porous substrate 1.

To enable the porous coating layer formed on the separator to restrain thermal shrinkage of the porous substrate as mentioned above, the inorganic particles should be sufficiently included in the porous coating layer above a predetermined content. However, the higher content of the inorganic particles, the lower content of the binder polymer. As a result, the inorganic particles of the porous coating layer may be detached due to stress occurring during assembly of the electrochemical device including winding and the like. The detached inorganic particles act as a local defect of the electrochemical device, and may give a bad influence on the safety of the electrochemical device. Accordingly, there is a need for development of a binder polymer capable of reinforcing the adhesive strength of a porous coating layer to a porous substrate.

Meanwhile, when a porous coating layer has a low packing density, the porous coating layer should be formed thicker sufficiently to perform a function of the porous coating layer. As a result, there is a limitation in reducing the thickness of a separator to increase the capacity of an electrochemical device.

DISCLOSURE OF INVENTION

Technical Problem

The present invention is designed to solve the problems of the prior art, and therefore, it is an object of the invention to provide a separator having an improved porous coating layer which may have a high packing density to facilitate to form a thin film battery without hindering safety, and which may have a good adhesive strength with a porous substrate to prevent detachment of inorganic particles during assembly of an electrochemical device, and an electrochemical device comprising the same.

Technical Solution

In order to achieve the object, the present invention provides a separator including (A) a porous substrate having pores, and (B) a porous coating layer formed on at least one surface of the porous substrate and made from a mixture of inorganic particles and a binder polymer. The binder polymer may contain a copolymer of (a) a first monomer unit with at least one of an amine group and an amide group at a side chain, and (b) a second monomer unit of (meth) acrylate with an alkyl group having 1 to 14 carbon atoms.

In the separator of the present invention, the content of the first monomer unit may be preferably 10 to 80 mol % per the whole copolymer, and the content of the second monomer unit may be preferably 20 to 90 mol % per the whole copolymer.

The first monomer unit may be 2(((butoxyamino)carbonyl)oxy)ethyl(meth)acrylate, 2-(diethylamino)ethyl(meth) acrylate, 2-(dimethylamino)ethyl(meth)acrylate, 3-(diethylamino)propyl(meth)acrylate, 3-(dimethylamino)propyl (meth)acrylate, methyl 2-acetoamido(meth)acrylate, 2-(meth)acrylamidoglycolic acid, 2-(meth)acrylamido-2- methyl-1-propane sulfonic acid, (3-(meth)acrylamidopropyl)trimethyl ammonium chloride, N-(meth)acryloylamido-ethoxyethanol, 3-(meth)acryloylamino-1-propanol, N-(butoxymethyl)(meth)acryloamide, N-tert-butyl(meth)acrylamide, diacetone(meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl)(meth)acrylamide, N—N'-(1,3-phenylene)dimaleimide, N—N'-(1,4-phenylene)dimaleimide, N—N'-(1,2-dihydroxyethylene)bisacrylamide, N—N'-ethylenebis(meth)acrylamide, or N-vinylpyrrolidone, singularly or in combination, and the second monomer unit may be methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylbutyl(meth)acrylate, 2-ethylhexyl(meth)acrylate, n-octyl(meth)acrylate, isooctyl(meth)acrylate, isononyl(meth)acrylate, lauryl(meth)acrylate, or tetradecyl(meth)acrylate, singularly or in combination.

In the separator of the present invention, preferably the copolymer may further have (c) a third monomer unit with a cyano group, and the content of the third monomer unit may be preferably 5 to 50 mol % per the whole copolymer.

In the separator of the present invention, the copolymer may preferably have a monomer unit with a crosslinking functional group, by which the copolymer may be crosslinked.

In the separator of the present invention, the content of the binder polymer may be preferably 2 to 30 parts by weight per 100 parts by weight of the inorganic particles, and the porous coating layer of the separator may preferably have a packing density (D) of $0.40 \times D_{inorg} \leq D \leq 0.70 \times D_{inorg}$, where $D=(Sg-Fg)/(St-Ft)$, Sg is a weight (g) of a unit area (m$^2$) of the separator having the porous coating layer formed on the porous substrate, Fg is a weight (g) of a unit area (m$^2$) of the porous substrate, St is a thickness (μm) of the separator having the porous coating layer formed on the porous substrate, Ft is a thickness (μm) of the porous substrate.

The separator of the present invention may be interposed between a cathode and an anode, and may used for electrochemical devices such as lithium secondary batteries and super capacitors.

Advantageous Effects

The separator of the present invention may have a porous coating layer of a high packing density and of a good adhesive strength with a porous substrate, resulting in decreased resistance, and thereby easily forming a thin film electrochemical device without hindering safety, which may contribute to the increase capacity of the electrochemical device. Also, the separator of the present invention may have the increased resistance against thermal and mechanical impact, thereby preventing detachment of inorganic particles in the porous coating layer.

BRIEF DESCRIPTION OF THE DRAWINGS

Other objects and aspects of the present invention will become apparent from the following description of embodiments with reference to the accompanying drawing in which:

The FIGURE is a schematic cross-sectional view illustrating a separator having a porous coating layer.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A separator of the present invention may include (A) a porous substrate having pores, and (B) a porous coating layer formed on at least one surface of the porous substrate and made from a mixture of inorganic particles and a binder polymer. The binder polymer may contain a copolymer of (a) a first monomer unit with at least one of an amine group and an amide group at a side chain, and (b) a second monomer unit of (meth)acrylate with an alkyl group having 1 to 14 carbon atoms. The copolymer may be represented as (first monomer unit)$_m$–(second monomer unit)$_n$ (0<m<1, 0<n<1). When the copolymer has the first monomer unit and the second monomer unit, the copolymer may include all types of copolymers including a random copolymer, a block copolymer, and the like.

The first and second monomer units in the copolymer may give a high adhesive strength between the inorganic substances or between the inorganic substance and the porous substrate. Accordingly, the porous coating layer may have few defect and a high packing density. As a result, the separator of the present invention may contribute to easy formation of a thin film battery, high stability against external impact, and prevention of detachment of inorganic particles.

The first monomer unit with at least one of an amine group and an amide group at a side chain may be 2(((butoxyamino)carbonyl)oxy)ethyl(meth)acrylate, 2-(diethylamino)ethyl(meth)acrylate, 2-(dimethylamino)ethyl(meth)acrylate, 3-(diethylamino)propyl(meth)acrylate, 3-(dimethylamino)propyl(meth)acrylate, methyl 2-acetoamido(meth)acrylate, 2-(meth)acrylamidoglycolic acid, 2-(meth)acrylamido-2-methyl-1-propane sulfonic acid, (3-(meth)acrylamidopropyl)trimethyl ammonium chloride, N-(meth)acryloylamido-ethoxyethanol, 3-(meth)acryloyl amino-1-propanol, N-(butoxymethyl)(meth)acryloamide, N-tert-butyl(meth)acrylamide, diacetone(meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl)(meth)acrylamide, N—N'-(1,3-phenylene)dimaleimide, N—N'-(1,4-phenylene)dimaleimide, N—N'-(1,2-dihydroxyethylene)bisacrylamide, N—N'-ethylenebis(meth)acrylamide, or N-vinylpyrrolidone, singularly or in combination. Preferably, the first monomer unit may be an acryl-based monomer unit.

Also, the second monomer unit of (meth)acrylate with an alkyl group having 1 to 14 carbon atoms may be methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)

acrylate, 2-ethylbutyl(meth)acrylate, 2-ethylhexyl(meth)acrylate, n-octyl(meth)acrylate, isooctyl(meth)acrylate, isononyl(meth)acrylate, lauryl(meth)acrylate, or tetradecyl(meth)acrylate, singularly or in combination. When the number of the carbon atoms included in the alkyl group of the second monomer unit exceeds 14, the length of the alkyl group may excessively increase and nonpolarity may become larger, resulting in reduced packing density of the porous coating layer.

In the separator of the present invention, the content of the first monomer unit may be preferably 10 to 80 mol % per the whole copolymer, and more preferably, 15 to 80 mol %. When the content is less than 10 mol %, a packing density and an adhesive strength of the porous coating layer may be reduced. When the content exceeds 80 mol %, a packaging density of the porous coating layer may excessively increase and an electrical resistance may excessively increase. Meanwhile, the content of the second monomer unit may be preferably 20 to 90 mol % per the whole copolymer. When the content is less than 20 mol %, an adhesive strength with the porous substrate may be reduced. When the content exceeds 90 mol %, the content of the first monomer unit may be reduced and a packing performance of the porous coating layer may be decreased.

In the separator of the present invention, the copolymer may further have (c) a third monomer unit with a cyano group. The third monomer unit may be ethyl cis-(beta-cyano)(meth)acrylate, (meth)acrylonitrile, 2-(vinyloxy)ethanenitrile, 2-(vinyloxy)propanenitrile, cyanomethyl(meth)acrylate, cyanoethyl(meth)acrylate, cyanopropyl(meth)acrylate, and the like. The content of the third monomer unit may be preferably 5 to 50 mol % per the whole copolymer.

In the separator of the present invention, the copolymer may have a monomer unit with a crosslinking functional group, by which the copolymer may be crosslinked. The crosslinking functional group may be a hydroxyl group, a primary amine group, a secondary amine group, an acid group, an epoxy group, an oxetane group, an imidazole group, an oxazoline group, and the like. For example, 1 to 20 mol % of the monomer unit with the crosslinking functional group may be further copolymerized with the copolymer, and the resulting copolymer may be crosslinked using a curing agent such as an isocyanate compound, an epoxy compound, an oxetane compound, an aziridine compound, a metal chelating agent, and the like.

Additionally, the above-described copolymer may further have other monomer units within the scope of the present invention. For example, to improve the ion conductivity of the separator, the copolymer may be further copolymerized with (meth)acrylic acid alkylene oxide additives, such as alkoxy diethyleneglycol(meth)acrylic acid ester, alkoxy triethyleneglycol(meth)acrylic acid ester, alkoxy tetraethyleneglycol(meth)acrylic acid ester, phenoxy diethyleneglycol (meth)acrylic acid ester, alkoxy dipropyleneglycol(meth)acrylic acid ester, alkoxy tripropyleneglycol(meth)acrylic acid ester, phenoxy dipropyleneglycol (meth)acrylic acid ester, and the like, wherein alkoxy has 1 to 8 carbon atoms.

It is obvious to an ordinary person skilled in the art that the above-described copolymer may be mixed with other binder polymers for the binder polymer of the present invention, without departing from the spirit of the present invention.

In the separator of the present invention, the inorganic particles used in forming the porous coating layer are not limited to specific kind of inorganic particles if they are electrochemically stable. That is, the inorganic particles usable in the present invention are not limited to specific kind of inorganic particles if they do not provoke an oxidation and/or reduction reaction in an operating voltage range (for example, 0 to 5V for Li/Li$^+$) of an electrochemical device to be applied. In particular, when inorganic particles with ion transferring capability are used, ion conductivity in an electrochemical device may be increased and performance of the electrochemical device may be improved.

Also, when inorganic particles with a high dielectric constant are used, dissociation of electrolyte salts, for example, lithium salts, in a liquid electrolyte may be increased and ion conductivity of the electrolyte may be improved.

For these reasons, the inorganic particles may preferably include inorganic particles having a dielectric constant of 5 or above, preferably 10 or above, inorganic particles having lithium-ion transferring capability, or mixtures thereof. For example, inorganic particle having a dielectric constant of 5 or above may include, but not limited to, $BaTiO_3$, $Pb(Zr_x,Ti_{1-x})O_3$ (PZT), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, or $TiO_2$, singularly or in combination.

In particular, the exemplary inorganic particles such as $BaTiO_3$, $Pb(Zr_x,Ti_{1-x})O_3$ (PZT), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN—PT), and hafnia ($HfO_2$) show a high dielectric constant of 100 or above, and have piezoelectricity to make a potential difference between both surfaces due to electric charges occurring when an extension or compression force is applied to the inorganic particles under a predetermined pressure, thereby preventing an internal short circuit in both electrodes caused by an external impact and consequently improving safety of an electrochemical device. Also, when a mixture of the inorganic particles having a high dielectric constant and the inorganic particles having lithium ion transferring capability is used, the effect of synergy may be obtained.

In the present invention, the inorganic particles having lithium ion transferring capability means inorganic particles that contain lithium atoms and are capable of moving lithium ions, but not store lithium. Because a kind of defect exists in the particle structure of the inorganic particles having lithium ion transferring capability, the inorganic particles having lithium ion transferring capability may transfer and move lithium ions, thereby improving the lithium ion conductivity in a battery and consequently improving the performance of the battery. The inorganic particles having lithium ion transferring capability may include, but not limited to, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, $P_2S_5$ based glass ($Li_xP_yS_z$, $0<x<3$, $0<y<3$, $0<z<7$) such as $LiI$—$Li_2S$—$P_2S_5$, or mixtures thereof.

In the separator of the present invention, an average particle size of the inorganic particles in the porous coating layer is not limited to a specific value, however an average particle size may be preferably 0.001 to 10 μm so as to form a coating layer of a uniform thickness and ensure a suitable porosity. When the average particle size is less than 0.001 μm, dispersion of the inorganic particles may be deteriorated, which makes it difficult to control the properties of the separator. When the average particle size exceeds 10 μm, the thickness of the porous coating layer may be increased, resulting in deterioration of the mechanical properties. Also, the excessively increased pore size may raise the likelihood that an internal short circuit may occur during charging or discharging of a battery.

According to the present invention, the content of the binder polymer in the porous coating layer of the separator may be preferably 2 to 30 parts by weight per 100 parts by weight of the inorganic particles, and more preferably, 5 to 15 parts by weight. When the content is less than 2 parts by weight, the inorganic substance may be detached. When the content exceeds 30 parts by weight, the binder polymer may stop the pores of the porous substrate, resulting in increased resistance and decreased porosity of the porous coating layer.

In the separator of the present invention, a packing density (D) of the porous coating layer is defined as a density of the porous coating layer when the porous coating layer is loaded 1 μm high per unit area ($m^2$) of the porous substrate. Preferably, D may be in the range of $0.40 \times D_{inorg} \leq D \leq 0.70 \times D_{inorg}$, where $D=(Sg-Fg)/(St-Ft)$, Sg is a weight (g) of a unit area ($m^2$) of the separator having the porous coating layer formed on the porous substrate, Fg is a weight (g) of a unit area ($m^2$) of the porous substrate, St is a thickness (μm) of the separator having the porous coating layer formed on the porous substrate, Ft is a thickness (μm) of the porous substrate, $D_{inorg}$ is a density ($g/m^2 \times \mu m$) of the used inorganic particles. When at least two kinds of inorganic particles are used, $D_{inorg}$ may be calculated using a density and a usage ratio of each kind of the inorganic particles used.

When D is less than the lower limit, the porous coating layer may have a loose structure and its function of suppressing the thermal shrinkage of the porous substrate may be deteriorated and the mechanical impact resistance may be reduced. When D exceeds the upper limit, the properties may be improved due to the increased packing density, however porosity of the porous coating layer may be reduced and electrical conductivity of the separator may be reduced.

Preferably, the thickness of the porous coating layer including the inorganic particles and the binder polymer may be between 0.5 and 10 μm, however the present invention is not limited in this regard.

Also, in the separator of the present invention, the porous substrate having a plurality of pores is not limited to a specific kind of porous substrate if it is a typical porous substrate for an electrochemical device. For example, the porous substrate having a plurality of pores may be a porous substrate made from at least one of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide, and polyethylenenaphthalene. The porous substrate may be used as a film type, or a non-woven type. The thickness of the porous substrate is not limited to a specific value, however the thickness of the porous substrate may be preferably between 5 and 50 μm. Preferably, the pore size of the porous substrate may be between 0.01 and 50 μm, and porosity of the porous substrate may be between 10 and 95%. However, the present invention is not limited in this regard.

Hereinafter, a preferred method for manufacturing the separator having the porous coating layer according to the present invention is described below. However, the present invention is not limited in this regard.

First, the above-described copolymer having the first monomer unit and the second monomer unit may be prepared, and may be dissolved in a solvent to prepare a binder polymer solution.

Subsequently, the inorganic particles may be added to and dispersed in the binder polymer solution. Preferably, the solvent may have a similar solution index to that of a binder polymer to be used, and may have a low boiling point. This will help uniform mixture and facilitate to subsequent removal of the solvent. Non-limiting examples of usable solvents may include acetone, tetrahydrofuran, methylene chloride, chloroform, dimethylformamide, N-methyl-2-pyrrolidone (NMP), cyclohexane, water, or mixtures thereof. After the inorganic particles are added to the binder polymer solution, the inorganic particles may be preferably pulverized. At this time, a suitable pulverization time may be between 1 and 20 hours, and an average particle size of the pulverized inorganic particles may be preferably between 0.001 and 10 μm as mentioned above. Conventional pulverization methods may be used, and ball milling may be particularly preferred.

Next, the binder polymer solution, in which the inorganic particles are dispersed, may be coated on the porous substrate under the humidity condition between 10 and 80%, followed by drying.

To coat the porous substrate with the binder polymer solution, in which the inorganic particles are dispersed, conventional coating methods well known in the art may be used. For example, various methods such as dip coating, die coating, roll coating, comma coating, or combinations thereof may be used. Also, the porous coating layer may be selectively formed on both surfaces or any one surface of the porous substrate.

The separator manufactured as described above according to the present invention may be used for an electrochemical device. That is, the separator of the present invention may be useful as a separator interposed between a cathode and an anode. The electrochemical device may be any device in which electrochemical reactions may occur, and for example, may include all kinds of primary batteries, secondary batteries, fuel cells, solar cells, capacitors such as a super capacitor, and the like. In particular, among secondary batteries, lithium secondary batteries including lithium metal secondary batteries, lithium ion secondary batteries, lithium polymer secondary batteries, and lithium ion polymer secondary batteries may be preferred.

The electrochemical device may be fabricated according to conventional methods well known in the art. For example, the electrochemical device may be fabricated by laminating a cathode and an anode with the above-described separator interposed therebetween, and injecting an electrolyte therein.

There is no special limitation in electrodes that may be used together with the separator of the present invention, and according to an embodiment, the electrode may be manufactured by bonding an electrode active material to an electrode current collector. Among the electrode active material, a non-limiting example of a cathode active material may include a typical cathode active material for a cathode of an electrochemical device. Particularly, the cathode active material may preferably be lithium manganese oxides, lithium cobalt oxides, lithium nickel oxides, lithium iron oxides, lithium iron phosphorous oxides, or lithium composite oxides thereof. Also, a non-limiting example of an anode active material may include a typical anode active material for an anode of an electrochemical device. Particularly, the anode active material may preferably be lithium metals or lithium alloy, lithium intercalation materials such as carbon, petroleum coke, activated carbon, graphite, or other carbonaceous materials. A non-limiting example of a cathode current collector may include a foil made of aluminum, nickel, or combinations thereof, and a non-limiting example of an anode current collector may include a foil made of copper, gold, nickel, copper alloys, or combinations thereof.

The electrolyte useable in the present invention may include a salt represented by the formula of $A^+B^-$, wherein $A^+$ represents an alkali metal cation such as $Li^+$, $Na^+$, $K^+$, or combinations thereof, and $B^-$ represents an salt containing an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof. The salt may be dissolved or dissociated in an organic solvent, for example, including, but not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone), or mixtures thereof.

The electrolyte may be injected in a suitable step of a battery fabrication process, based on a fabrication process and desired properties of a final product. In other words, the electrolyte may be injected before or during a battery assembly process.

Generally, the separator of the present invention is applied to a battery in a winding process, however the separator may be applied to a battery in a folding process and a laminating or stacking process of the separator and the electrode. The separator of the present invention has excellent peeling resistance, thereby preventing detachment of the inorganic particles during the battery assembly process.

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Preparation of Copolymer

Copolymers were prepared using the monomers of the contents (molar parts) listed in the below Table 1.

TABLE 1

| Kinds of monomers | Copolymer 1 | Copolymer 2 | Copolymer 3 | Copolymer 4 | Copolymer 5 | Copolymer 6 |
|---|---|---|---|---|---|---|
| DMAAm | 40 | 31 | 60 | 20 | — | — |
| DMAEA | 20 | 4 | — | — | 35 | — |
| AN | 40 | 15 | — | 10 | 15 | 30 |
| EA | — | 46 | 10 | 66 | 30 | 30 |
| BA | — | — | 10 | — | 28 | 20 |
| IBA | — | — | 16 | — | — | 20 |
| AA | — | 4 | 4 | 4 | — | — |
| HBA | — | — | — | — | 2 | — |

In Table 1,
DMAAm is N-N-dimethylacrylamide,
DMAEA is N,N-dimethylaminoethyl acrylate,
AN is acrylonitrile,
EA is ethyl acrylate,
BA is n-butyl acrylate,
IBA is isobutyl acrylate,
AA is acrylic acid, and
HBA is hydroxybutyl acrylate.

Example and Comparative Example

Separators were manufactured using the components listed in the below Table 2.

Each copolymer and a curing agent were dissolved in an acetone to prepare a binder polymer solution. Inorganic particles were added to the binder polymer solution at a weight ratio, polymer/curing agent/inorganic particles=7.15/0.35/92.5, and were milled and dispersed using ball milling for 3 hours, to prepare a slurry. A particle size of the inorganic particles in the prepared slurry may be controlled based on a size (grain size) of a bead used in a ball mill and a ball milling time. In the example 1, the inorganic particles were milled such that the particle size was about 400 nm. The prepared slurry was coated on one side or both sides of a porous polyethylene film (porosity: 45%) having 12 μm thickness.

The manufactured separator was cut by 50 mm×50 mm, and was measured for porosity, a thermal shrinkage ratio, a peel strength, and a packing density (D) of a porous coating layer using the methods as described below. The measurement results are shown in Table 2.

Porosity was evaluated as the time (s) needed for air of 100 ml to completely pass through the separator.

Thermal shrinkage ratio was measured in a stretched direction of the separator after the separator was left at 150° C. for 1 hour.

Peel strength was evaluated as a force (gf/15 mm) needed to peel off a tape (3M transparent tape) securely attached to the exposed porous coating layer from the separator fixed on a glass plate with a double-sided tape, using a tensile strength measuring machine.

TABLE 2

| | Example | | | | | | | Comparative example | | | |
|---|---|---|---|---|---|---|---|---|---|---|---|
| | 1 | 2 | 3 | 4 | 5 | 6 | 7 | 1 | 2 | 3 | 4 |
| Number of copolymers used | 1 | 2 | 2 | 3 | 4 | 5 | 1 | 6 | PVdF-HFP | PVdF-HFP | PVdF-HFP |
| Inorganic particles | $Al_2O_3$ | $Al_2O_3$ | $Al_2O_3$ | $Al_2O_3$ | $Al_2O_3$ | $Al_2O_3$ | $Al_2O_3$ + $BaTiO_3$ | $Al_2O_3$ | $Al_2O_3$ | $Al_2O_3$ | $Al_2O_3$ |
| Curing agent | — | epoxy | epoxy | epoxy | epoxy | isocyanate | — | — | — | — | — |
| Type of | Both | Both | One | Both | Both | Both | Both | Both | Both | Both | One |

TABLE 2-continued

|  | Example | | | | | | | Comparative example | | | |
|---|---|---|---|---|---|---|---|---|---|---|---|
|  | 1 | 2 | 3 | 4 | 5 | 6 | 7 | 1 | 2 | 3 | 4 |
| porous coating layer (thickness of one surface, μm) | surfaces (3) | surfaces (2) | surface (2) | surfaces (3) | surfaces (2) | surfaces (3) | surfaces (2) | surfaces (3) | surfaces (4) | surfaces (2) | surface (3) |
| Porosity (s/100 ml) | 380 | 364 | 332 | 420 | 380 | 395 | 374 | 345 | 380 | 323 | 344 |
| Thermal shrinkage ratio (%) | <4 | <5 | <8 | <4 | <10 | <5 | <6 | >34 | >20 | >60 | >62 |
| Peel strength (gf/15 mm) | 62 | 42 | 44 | 56 | 40 | 43 | 66 | 15 | 17 | 15 | 17 |
| Packing density (D) | $0.59 \times D_{inorg}$ | $0.55 \times D_{inorg}$ | $0.51 \times D_{inorg}$ | $0.58 \times D_{inorg}$ | $0.46 \times D_{inorg}$ | $0.56 \times D_{inorg}$ | $0.55 \times D_{inorg}$ | $0.36 \times D_{inorg}$ | $0.39 \times D_{inorg}$ | $0.34 \times D_{inorg}$ | $0.37 \times D_{inorg}$ |

Manufacture of Anode 96 weight % of carbon powder as an anode active material, 3 weight % of polyvinylidene fluoride (PVdF) as a binding agent, and 1 weight % of carbon black as a conductive material were added to N-methyl-2 pyrrolidone (NMP) as a solvent, to prepare an anode mix slurry. The anode mix slurry was applied to a copper (Cu) foil as an anode current collector having 10 μm thickness, followed by drying, to manufacture an anode, which was roll-pressed.

Manufacture of Cathode 92 weight % of lithium cobalt composite oxide as a cathode active material, 4 weight % of carbon black as a conductive material, and 4 weight % of PVdF as a binding agent were added to N-methyl-2 pyrrolidone (NMP) as a solvent, to prepare a cathode mix slurry. The cathode mix slurry was applied to an aluminum (Al) foil as a cathode current collector having 20 μm thickness, followed by drying, to manufacture a cathode, which was roll-pressed.

Fabrication of Battery

Batteries were fabricated by assembling the manufactured electrodes and the manufactured separators using a stacking method, and by injecting an electrolyte in the assembled result, the electrolyte being ethylene carbonate (EC)/ethyl methyl carbonate (EMC)=1/2 (volumetric ratio) and 1 mole of lithium hexafluorophosphate (LiPF6).

A hot box test and a cycle performance test at 60° C. were carried out on the fabricated batteries, and the test results are shown in Tables 3 and 4.

TABLE 3

|  | Example | | | | | | | Comparative example | | | |
|---|---|---|---|---|---|---|---|---|---|---|---|
|  | 1 | 2 | 3 | 4 | 5 | 6 | 7 | 1 | 2 | 3 | 4 |
| 150° C., 1 h | ○ | ○ | ○ | ○ | ○ | ○ | ○ | ○ | ○ | ○ | ○ |
| 150° C., 2 h | ○ | ○ | ○ | ○ | ○ | ○ | ○ | ○ | ○ | ○ | ○ |
| 160° C., 1 h | ○ | ○ | ○ | ○ | ○ | ○ | ○ | ○ | ○ | ○ | Explosion |
| 160° C., 2 h | ○ | ○ | ○ | ○ | ○ | ○ | ○ | Explosion | Explosion | Explosion | Explosion |

TABLE 4

| Number of cycles | Example | | | | | | | Comparative example | | | |
|---|---|---|---|---|---|---|---|---|---|---|---|
|  | 1 | 2 | 3 | 4 | 5 | 6 | 7 | 1 | 2 | 3 | 4 |
| 100 | 97% | 99% | 98% | 99% | 97% | 99% | 99% | 95% | 95% | 93% | 95% |
| 200 | 95% | 96% | 95% | 97% | 96% | 96% | 96% | 91% | 90% | 89% | 91% |
| 300 | 93% | 93% | 92% | 94% | 93% | 93% | 92% | 88% | 88% | 85% | 88% |

What is claimed is:

1. A separator, comprising:
(A) a porous substrate having pores; and
(B) a porous coating layer formed on at least one surface of the porous substrate and made from a mixture of inorganic particles and a binder polymer,
wherein the binder polymer contains a copolymer polymerized from monomer units comprising 10 to 80 mol % of a first monomer unit with at least one of an amine group or an amide group at a side chain, and 20 to 90 mol % of a second monomer unit of (meth)acrylate with an alkyl group having 1 to 14 carbon atoms, based on the total moles of monomer units;
and
wherein the porous coating layer has a packing density (D) of $0.40 \times D_{inorg} \leq D \leq 0.70 \times D_{inorg}$, where $D=(Sg-Fg)/(St-Ft)$, Sg is a weight (g) of a unit area ($m^2$) of the separator having the porous coating layer formed on the porous substrate,
Fg is a weight (g) of a unit area ($m^2$) of the porous substrate,
St is a thickness (μm) of the separator having the porous coating layer formed on the porous substrate,
Ft is a thickness (μm) of the porous substrate, and
$D_{inorg}$ is a density (g/$m^2 \times$μm) of the inorganic particles.

2. The separator according to claim 1,
wherein the first monomer unit is at least one selected from the group consisting of 2(((butoxyamino)carbonyl)oxy)ethyl(meth)acrylate, 2-(diethylamino)ethyl (meth)acrylate, 2-(dimethylamino)ethyl(meth)acrylate, 3-(diethylamino)propyl(meth)acrylate, 3-(dimethylamino) propyl(meth)acrylate, methyl 2-acetoamido (meth)acrylate, 2-(meth)acrylamidoglycolic acid, 2-(meth)acrylamido-2-methyl-1-propane sulfonic acid, (3-(meth)acrylamidopropyl)trimethyl ammonium chloride, N-(meth)acryloylamido-ethoxyethanol, 3-(meth)acryloyl amino-propanol, N-(butoxymethyl)(meth)acryloamide, N-tert-butyl(meth)acrylamide, diacetone (meth)acrylamide, N,N-dimethyl(meth)acrylamide, N-(isobutoxymethyl)acrylamide, N-(isopropyl) (meth)acrylamide, (meth)acrylamide, N-phenyl(meth)acrylamide, N-(tris(hydroxymethyl)methyl) (meth)acrylamide, N—N'-(1,3-phenylene)dimaleimide, N—N'-(1,4-phenylene)dimaleimide, N—N'-(1,2-dihydroxyethylene)bisacrylamide, N—N'-ethylenebis(meth)acrylamide, and N-vinylpyrrolidone.

3. The separator according to claim 1,
wherein the second monomer unit is at least one selected from the group consisting of methyl(meth)acrylate, ethyl(meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylbutyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate.

4. The separator according to claim 1,
wherein the monomer units further comprise a third monomer unit with (c) a cyano group.

5. The separator according to claim 4,
wherein the content of the third monomer unit is 5 to 50 mol %, based on the total moles of monomer units.

6. The separator according to claim 1,
wherein the copolymer has a monomer unit with a crosslinking functional group, and the copolymer is crosslinked by the crosslinking functional group.

7. The separator according to claim 1,
wherein the inorganic particles have an average particle size between 0.001 and 10 μm.

8. The separator according to claim 1,
wherein the inorganic particles are selected from the group consisting of inorganic particles having a dielectric constant of 5 or above, and inorganic particles having lithium-ion transferring capability, or mixtures thereof.

9. The separator according to claim 8,
wherein the inorganic particle having a dielectric constant of 5 or above are inorganic particles of at least one selected from the group consisting of $BaTiO_3$, $Pb(Zr_x,Ti_{1-x})O_3$ (PZT), $Pb_{1-x}La_xZr_{1-y}Ti_yO_3$ (PLZT, 0<x<1, 0<y<1), $(1-x)Pb(Mg_{1/3}Nb_{2/3})O_3$-$xPbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, and $TiO_2$.

10. The separator according to claim 8,
wherein the inorganic particles having lithium ion transferring capability are inorganic particles of at least one selected from the group consisting of lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ ($Li_xSi_yS_z$, 0<x<3, 0<y<2, 0<z<4) based glass, and $P_2S_5$ ($Li_xP_yS_z$, 0<x<3, 0<y<3, 0<z<7) based glass.

11. The separator according to claim 1,
wherein the content of the binder polymer is 2 to 30 parts by weight per 100 parts by weight of the inorganic particles.

12. The separator according to claim 1,
wherein the thickness of the porous coating layer is between 0.5 and 10 μm.

13. The separator according to claim 1,
wherein the porous substrate is made from at least one selected from the group consisting of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide, and polyethylenenaphthalene.

14. An electrochemical device comprising:
a cathode;
an anode; and
a separator interposed between the cathode and the anode, wherein the separator is defined in claim 1.

15. The electrochemical device according to claim 14,
wherein the electrochemical device is a lithium secondary battery.

* * * * *